US012030381B2

United States Patent
Perotto (10) Patent No.: US 12,030,381 B2
(45) Date of Patent: Jul. 9, 2024

(54) SPEED MEASUREMENT USING TIME-OF-FLIGHT SENSING AND ANTI-COLLISION PROTECTION USING TIME-OF-FLIGHT SENSING

(71) Applicant: STMicroelectronics (Grenoble 2) SAS, Grenoble (FR)

(72) Inventor: Thomas Perotto, Grenoble (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 528 days.

(21) Appl. No.: 17/176,068

(22) Filed: Feb. 15, 2021

(65) Prior Publication Data

US 2021/0268903 A1     Sep. 2, 2021

(30) Foreign Application Priority Data

Feb. 28, 2020   (EP) .................................. 20160028

(51) Int. Cl.
*G01S 17/931* (2020.01)
*B60K 31/00* (2006.01)
(Continued)

(52) U.S. Cl.
CPC ....... *B60K 31/0008* (2013.01); *B60W 30/146* (2013.01); *G01S 17/06* (2013.01); *G01S 17/58* (2013.01); *G01S 17/931* (2020.01); *B60W 2300/365* (2013.01); *B60W 2554/404* (2020.02); *B60W 2554/804* (2020.02)

(58) Field of Classification Search
CPC ............ B60K 31/0008; B60W 30/146; B60W 2300/365; B60W 2554/404; B60W 2554/804; G01S 17/06; G01S 17/58; G01S 17/931; B62K 3/002; B60T 8/1706; B62J 45/413
See application file for complete search history.

(56) References Cited

U.S. PATENT DOCUMENTS 5,220,266 A * 6/1993 Kobayashi .............. G01P 3/486
388/902
5,936,549 A   8/1999 Tsuchiya
(Continued)

FOREIGN PATENT DOCUMENTS

CN   102109821 A   6/2011
CN   104340326 A   2/2015
(Continued)

OTHER PUBLICATIONS

EP Search Report and Written Opinion for EP Appl. No. 20160028.5 dated Oct. 9, 2020 (11 pages).
(Continued)

*Primary Examiner* — Peter D Nolan
*Assistant Examiner* — Anwar Mohamed
(74) *Attorney, Agent, or Firm* — Crowe & Dunlevy LLC (57) ABSTRACT

A measurement of the rotation speed of an object is made using a time-of-flight sensor configured to detect a passing of one or more of elements of the object through a given position. The time-of-flight sensor is further mounted on a one-person vehicle configured to protect the one-person vehicle against collisions through the making a time-of-flight measurement of a relative speed between the one-person vehicle and an obstacle.

32 Claims, 4 Drawing Sheets

(51) Int. Cl.
*B60W 30/14* (2006.01)
*G01S 17/06* (2006.01)
*G01S 17/58* (2006.01)

(56) References Cited

U.S. PATENT DOCUMENTS

| | | | |
|---|---|---|---|
| 9,668,322 B1 | 5/2017 | Winarski | |
| 11,520,332 B1* | 12/2022 | Zamiska | G05D 1/0251 |
| 2002/0041182 A1 | 4/2002 | Yamada | |
| 2002/0189336 A1* | 12/2002 | McEwan | G01M 17/027 |
| | | | 73/146 |
| 2009/0177433 A1* | 7/2009 | Palmer | G01P 3/49 |
| | | | 702/145 |
| 2010/0302158 A1 | 12/2010 | Fang et al. | |
| 2011/0160950 A1 | 6/2011 | Naderhirn et al. | |
| 2016/0363665 A1 | 12/2016 | Carlson et al. | |
| 2017/0160392 A1* | 6/2017 | Brisimitzakis | G01S 7/062 |
| 2017/0222738 A1* | 8/2017 | Hammerschmidt | G01P 3/44 |
| 2019/0004156 A1 | 1/2019 | Niclass et al. | |
| 2020/0070787 A1* | 3/2020 | Huang | B60T 7/042 |
| 2020/0324848 A1* | 10/2020 | Weagle | G01D 5/26 |
| 2023/0124645 A1* | 4/2023 | Robertson, Jr. | G01S 7/497 |
| | | | 356/5.01 |

FOREIGN PATENT DOCUMENTS

| | | |
|---|---|---|
| CN | 105664454 A | 6/2016 |
| CN | 107206905 A | 9/2017 |
| CN | 107972621 A | 5/2018 |
| CN | 109808680 A | 5/2019 |
| CN | 110035949 A | 7/2019 |
| CN | 110834587 A | 2/2020 |
| JP | H06335114 A | 12/1994 |
| JP | 2002264785 A | 9/2002 |
| JP | 2007323117 A | 12/2007 |
| KR | 1020070017041 A | 2/2007 |
| TW | M574122 U | 2/2019 |
| WO | 2016207615 A1 | 12/2016 |
| WO | 2019187854 A1 | 10/2019 |

OTHER PUBLICATIONS

First Office Action for counterpart EP Appl. No. 20160028.5, dated Mar. 13, 2023 (5 pgs.).
First Office Action and Search Report for counterpart CN Appl. No. 202110218931.9, report dated Mar. 7, 2024, 35 pgs.

* cited by examiner

SPEED MEASUREMENT USING TIME-OF-FLIGHT SENSING AND ANTI-COLLISION PROTECTION USING TIME-OF-FLIGHT SENSING

PRIORITY CLAIM

This application claims the priority benefit of European Application for Patent No. 20160028.5, filed on Feb. 28, 2020, the content of which is hereby incorporated by reference in its entirety to the maximum extent allowable by law.

TECHNICAL FIELD

The present disclosure generally relates to measurements of the displacement speed, for example, of a vehicle, and of the rotation speed, for example, of a wheel of a vehicle.

PRIOR ART

Wheels equip various so-called one-seater or one-person vehicles, also called individual or one-person transport vehicles. A vehicle is called one-person when it is designed for the displacement of a single person at a time. A one-person vehicle may be equipped with an electric motor to propel the vehicle.

Wheels also equip various sports training devices, such as bicycles called exercise bikes.

There is a need to measure the speed of a one-person vehicle.

There is a need to ensure the security of persons displacing by using a one-person vehicle. In particular, there is a need to limit the risk of collision.

There is a need to measure the rotation speed of a rotating object such as a vehicle wheel, in particular of a one-person vehicle, or such as a wheel of a sports training device.

There is a need in the art to overcome all or part of the disadvantages of known method and devices for measuring the rotation speed of an object and/or for measuring the displacement speed of a vehicle.

There is a need in the art to overcome all or part of the disadvantages of known one-person vehicles.

SUMMARY

In an embodiment, a method is provided for measuring the rotation speed of an object, comprising time-of-flight detections of the passing of one or a plurality of elements of said object through a given position.

An embodiment provides a device for measuring the rotation speed of an object, configured to implement time-of-flight detections of the passing of one or a plurality of elements of said object through a given position.

According to an embodiment, said object is a wheel and said one or a plurality of elements comprise one or a plurality of spokes of the wheel. Alternatively, said one or a plurality of elements are attached to one or a plurality of spokes of the wheel.

According to an embodiment, the wheel is a wheel of a one-person vehicle or of a sports training device, and a speed of the one-person vehicle or of the device is delivered based on the measured rotation speed.

According to an embodiment, a value representative of the rotation speed is measured, by using a given number, greater than or equal to two, of time intervals between said detections, the given number being preferably strictly between three and ten times a number of said one or a plurality of elements.

According to an embodiment, the sensor: is rigidly secured to an element which is fixed with respect to said position and oriented towards said position; or is rigidly secured to said object to be oriented, at the times of said passages, towards an element which is fixed with respect to said position.

According to an embodiment, the time-of-flight sensor is contained in an integrated circuit package.

According to an embodiment, the device is configured to distinguish, preferably at regularly repeated times, between the presence and the absence of an element in front of the detector and at a distance from the detector shorter than a threshold, said detections comprising detections of the switching from said absence to said presence and/or from said presence to said absence.

An embodiment provides a one-person vehicle or a sports training device comprising a device such as defined hereabove.

According to an embodiment, the one-person vehicle or the sports training device comprises an arm comprising a bearing or a rotation shaft of said object, said fixed element being a portion of the arm or being attached to a portion of the arm.

According to the second aspect, an embodiment provides a method comprising a step of protection of a one-person vehicle against collisions, the protection step comprising a time-of-flight measurement of a relative speed between the one-person vehicle and an obstacle.

An embodiment provides a device configured to implement a step of protection of a one-person vehicle against collisions, the protection step comprising a time-of-flight measurement of a relative speed between the one-seater vehicle and an obstacle and, preferably, the delivery of a vehicle braking signal.

According to an embodiment, the presence of an obstacle is detected by time of flight.

According to an embodiment, the protection step is implemented only when a distance between the obstacle and a source of optical pulses of said measurement is shorter than a first distance threshold, the first distance threshold being preferably shorter than or equal to 4 meters.

According to an embodiment, the protection step is implemented when the obstacle is: at any position located: inside of a cone of emission of said pulses, the cone having a half cone angle and an axis substantially in a displacement direction of the vehicle; and at a distance from said source shorter than a second distance threshold shorter than the first distance threshold; and is any of: a single obstacle; and the closest obstacle to the vehicle among a plurality of obstacles, the half cone angle being preferably greater than or equal to approximately 10 degrees and/or the second distance threshold being preferably greater than or equal to approximately 2 meters.

According to an embodiment, measured values of a distance between the one-person vehicle and the obstacle are obtained a several times, preferably regularly repeated, said relative speed being obtained by linear regression of the measured values according to time.

According to an embodiment, a vehicle braking command is applied when the measured relative speed is greater than a speed threshold, the speed threshold being preferably smaller than or equal to 20 km/h.

According to an embodiment, the device comprises a time-of-flight distance sensor contained in an integrated circuit package.

An embodiment provides an electric one-person vehicle, comprising a device such as defined hereabove.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE DRAWINGS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, one-person vehicles are not described in detail, the described embodiments being compatible with usual one-person vehicles. Further, so-called time-of-flight or ToF sensors are not described in detail, the described embodiments being compatible with usual ToF sensors.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., unless specified otherwise, it is referred to the orientation of the drawings or to a vehicle in a normal position of use.

Unless specified otherwise, the expressions "about", "approximately", "substantially", and "in the order of" signify within 10%, preferably within 5%, or when they concern angles or absolute or relative angular orientations, within 10 degrees, and preferably within 5 degrees.

Unless specified otherwise, when elements are said to be rigidly secured, this means that these elements are mechanically connected to each other in rigid fashion, for example, fastened to each other, or that they form portions of a same part. In other words, these elements cannot displace or rotate with respect to each other.

Figure 1:
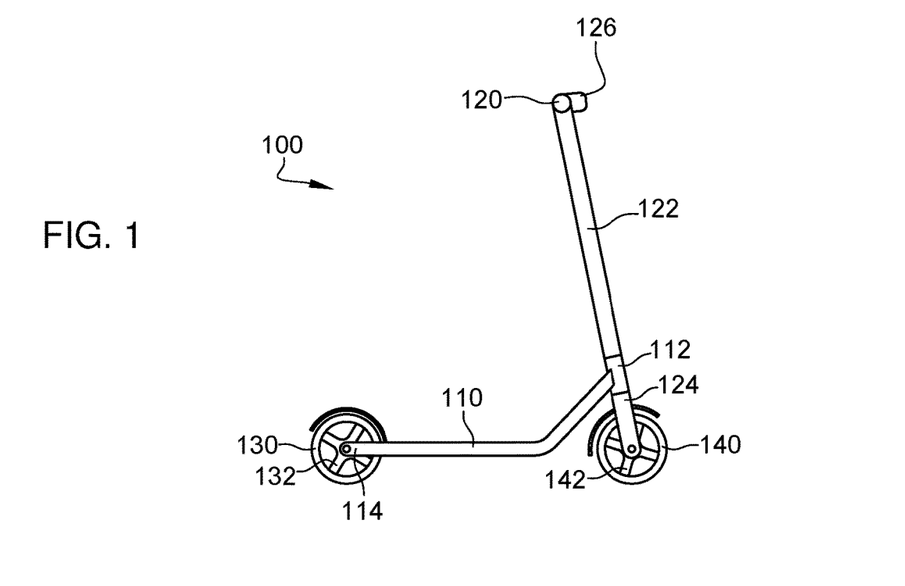
FIG. 1 schematically shows an example of a one-person vehicle of the type to which the described embodiments apply.

FIG. 1 schematically shows an example of a one-person vehicle of a type to which the described embodiments apply.

In the shown example, the one-person vehicle is a scooter 100, defined by a board 110 supported by two or three wheels and provided with a handlebar 120. Scooter 100 has two wheels in the present example, that is, a rear wheel 130 and a front wheel 140. Rear wheel 130 and/or front wheel 140 may comprise spokes, respectively 132 and 142.

Scooter 100 is typically equipped with an electric engine, and is then called electric scooter.

Handlebar 120 is continued by a rod 122 towards front wheel 140. Rod 122 crosses a rotation bearing 112 rigidly secured to board 110, and extends all the way to a fork 124 for holding front wheel 140, that is, a front fork. Front fork 124 and rod 122 are rigidly secured to each other.

Board 110 is further rigidly secured to a rear fork 114 for holding rear wheel 130.

Handlebar 120 may comprise a display 126 configured to display information for a user of scooter 100. Display 126 and the displayed information are not described in detail, the described embodiments being compatible with usual displays and the information usually displayed.

Although the shown example of a one-person vehicle here is a scooter, for example, electric, the applications of the embodiments described hereafter are not limited to this specific example.

Thus, in examples, the one-person vehicle is of any type comprising one of a plurality of supports provided, like the board 110 of scooter 100, to support at least one of the user's feet. The support(s) are supported by one or a plurality of wheels. The one-person vehicle may then comprise a handlebar, for example, such as handlebar 120, or may comprise no handlebar. Such a one-person vehicle may be propelled by a motor. Such a propelling by a motor is preferred in cases where the one-person vehicle comprises a single wheel or two wheels arranged on either side of a displacement direction. In such cases, the one-person vehicle typically comprises a gyroscopic stabilization device and thus forms, for a single wheel, a gyroscopic unicycle (gyrowheel) and, for two wheels, a gyropod.

In other examples, not shown, the one-person vehicle is of bicycle type, that is, a two-wheel vehicle, preferably directed with a handlebar, one of the wheels being driven by a crankset. The one-person vehicle may also be a tricycle, that is, a three-wheel vehicle, preferably directed with a handlebar, one of the wheels being driven by a crankset. The bicycle may be of electric power-assisted bicycle type, also called electric bicycle. An electric bicycle is defined by a bicycle or a tricycle propelled by an electric motor, the motor being preferably activated according to the crankset rotation.

The above-described examples of a one-person vehicle are not limiting, and the embodiments described hereafter may apply to any one-person vehicle, preferably having an off-load weight lighter than 50 kg, more preferably lighter than 30 kg.

Figure 2A:
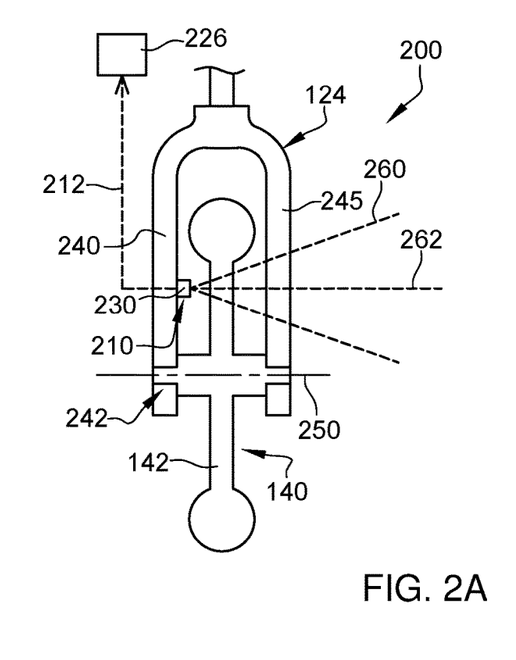
FIG. 2A shows a cross-section view and FIG. 2B shows a side view of a portion of an embodiment of a one-person vehicle, according to the first aspect.
Figure 2B:
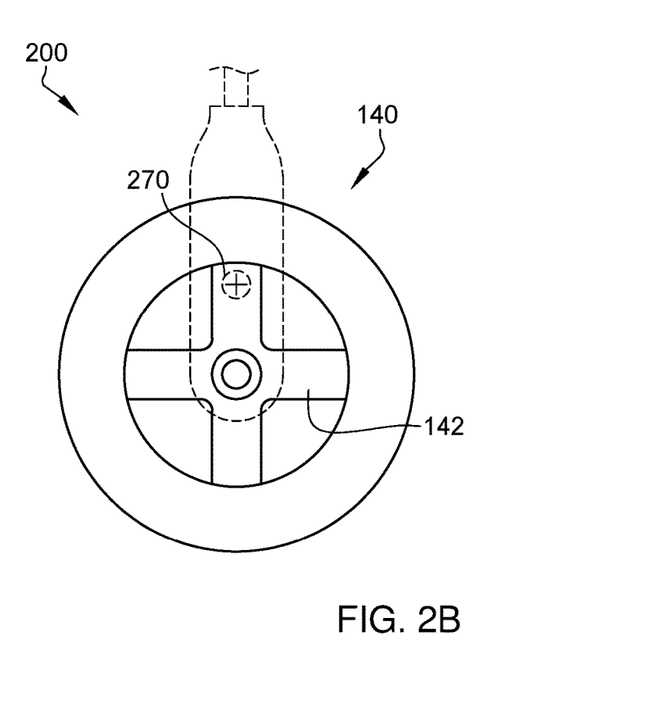

First Aspect:

FIG. 2A shows, in a cross-section view 2A and a side view 2B, a portion of an embodiment of a one-person vehicle 200, according to the first aspect. Views 2A and 2B match.

In the shown example, one-person vehicle 200 comprises elements identical or similar to those of the scooter 100 of FIG. 1. These elements are not described in detail again. Only the differences between one-person vehicle 200 and scooter 100 are here highlighted.

The shown portion comprises front wheel 140 and front fork 124. However, the embodiments described hereafter in their application to front wheel 140 and front fork 124 also apply to rear wheel 130 and rear fork 114.

One-person vehicle 200 is equipped with a device 210 for measuring the rotation speed of wheel 140. Device 210 may be coupled, by a connection 212, to a unit (i.e., circuitry) 226 of one-person vehicle 200. Connection 212 may be wired or wireless.

In an example, device 210 delivers a measured value of the rotation speed of wheel 140 to unit 226. Unit 226 may then be a display of the type of the display 126 of the scooter 100 of FIG. 1, with the difference that display 226 receives the measured value, calculates the speed of one-person vehicle 200 based on the measured value, and displays the speed of one-person vehicle 200. The calculation of the speed of one-person vehicle 200 based on the rotation speed of a wheel is not described in detail herein, the described embodiments being compatible with such a usual calculation. Unit 226 may also be, for example, formed by an electronic wireless communication device, such as a cell phone or a smart watch, comprising a program having its execution causing the reception of the measured value, the calculation of the speed of one-person vehicle 200 based on the measured value, and the display of the speed of one-person vehicle 200.

In another example, device 210 calculates the speed of one-person vehicle 200 based on the rotation speed of wheel 140. Device 210 delivers a value of the speed of one-person vehicle 200 to unit 226. Unit 226 may then be a display which differs from the display 126 of scooter 100 of FIG. 1 in that display 226 displays the speed of one-person vehicle 200 measured by device 210. Unit 226 may also be, for example, formed by a wireless electronic communication device, such as a cell phone or a smart watch, comprising a program having its execution causing the reception of the measured value and the display of the speed of one-person vehicle 200 measured by device 210.

Unit 226 may also be coupled, by wired or wireless connection, preferably connected, to an electric motor and/or to a braking system of one-person vehicle 200. As a complement of or to replace the display of the speed of one-person vehicle 200, unit 226 may take, based on the speed of one-person vehicle 200, measures such as a limitation of the speed of one-person vehicle 200. For this purpose, unit 226 may implement any usual one-person vehicle speed limitation method.

Device 210 comprises a time-of-flight sensor 230, or ToF sensor.

Such a ToF sensor comprises a source of optical pulses and an optical receiver. When the optical pulses emitted by the source are reflected by an element of an object external to the ToF sensor and the receiver receives part of the reflected pulses, the ToF sensor delivers, based on the time elapsed between the emission and the reception of each pulse, information relative to the presence of the outer object and/or information representative of a distance between the ToF sensor and the outer object.

Preferably, the optical pulses of ToF sensor 230 have wavelengths which are all or substantially all in near infrared, that is, wavelengths in the range from 700 nm to 1,500 nm, preferably in the range from 800 nm to 1,100 nm, more preferably in the range from 850 nm to 940 nm, for example, equal to 940 nm or to approximately 940 nm.

Preferably, the time-of-flight measurements, or ToF measurements, performed by ToF sensor 230 are regularly repeated, each ToF measurement being likely to correspond to a plurality of pulses. The frequency of the ToF measurements is then preferably in the range from 50 Hz to 5 kHz, for example, equal to 100 Hz or to approximately 100 Hz, to 300 Hz or to approximately 300 Hz, or also, for example, to 600 Hz or to approximately 600 Hz. The frequency of the ToF measurements may also be greater than 5 kHz.

ToF sensor 230 is, in the shown example, rigidly secured to a portion of an arm 240 of front fork 124. Front fork 124 may comprise another arm 245 located, with respect to arm 240, on the other side of wheel 140, symmetrically with respect to wheel 140. More particularly, arms 240 and 245 are arranged symmetrically with respect to a median plane of wheel 140 orthogonal to the axis of wheel 140.

Arm 240 forms a fixed element. Fixed element in this context means an element used as a reference to define the rotation of a rotating object such as, in the shown example, wheel 140. For a one-person vehicle, this element is fixed with respect to the one-person vehicle, that is, the fixed element is rigidly secured to the one-person vehicle. The fixed element thus accompanies the one-person vehicle in its displacements and is fixed relative to the rotation of the rotating object.

In the shown example, arm 240 comprises a rotation bearing 242 for wheel 140. Wheel 140 comprises a rotation shaft 250. Rotation shaft 250 rotates in bearing 242. In another example, not shown, arm 240 comprises a rotation shaft of wheel 140, and wheel 140 comprises a rotation bearing around the rotation shaft of wheel 140. In this other example, the rotation shaft of wheel 140 is thus fixed.

In operation, the optical pulses of ToF sensor 230 are typically emitted in an emission cone 260 having a central axis 262. More particularly, emission cone 260 is delimited by a boundary defined, in each plane orthogonal to axis 262, by the points where the intensity of the pulses is, per surface area unit of this plane, equal to a given percentage of a maximum intensity, in the absence of an element or of an object located on the path of the pulses. The given percentage is preferably smaller than or equal to 10%, for example, equal to 5%.

Based on the information from ToF sensor 230, device 210 detects the passing of spokes 142 in front of ToF sensor 230, that is, the passing of spokes 142 in emission cone 260 at a sufficiently small distance from ToF sensor 230 for the passing to be detectable. For this purpose, ToF sensor 230 is oriented so that spokes 142 pass, one after the other, in emission cone 260 when wheel 140 rotates. In the shown example, ToF sensor 230 is located inside of front fork 124. Axis 262 is, for example, horizontal or substantially horizontal, in a normal position of use of one-person vehicle 200.

Thus, device 210 detects the passing of spokes 142 through a position 270. Position 270 is defined by the intersection between emission cone 260 and the volume swept by spokes 142 during the rotation of wheel 140. ToF sensor 230 and position 270 are fixed with respect to each other, in particular, during motions of one-person vehicle 200. In other words, position 270 is a fixed position with respect to one-person vehicle 200, and the detector is oriented toward position 270.

Based on the detections of the passing of spokes 142 through position 270, device 210 calculates a value representative of the rotation speed of wheel 140. Embodiments of this calculation are detailed hereafter in relation with FIGS. 3 and 4. The representative value may be an analog or, preferably, digital value. The value representative of the rotation speed of wheel 140 is also a value representative of the displacement speed of one-person vehicle 200. Indeed, the rotation speed of wheel 140 and the displacement speed of one-person vehicle 200 are by a constant ratio. This ratio is a function of the diameter of wheel 140.

It could have been devised to measure a wheel rotation speed by positioning a magnet and a coil so that a voltage is induced in the coil at each passing of a spoke through a given position. As compared with such a rotation speed measurement, device 210 avoids having to add a magnet attached to one of spokes 142, and avoids for electromagnetic emissions, typically linked to the operation of an electric motor, to disturb the rotation speed measurement.

Further, the speed measurement implemented by device 210 has the advantage of being independent from the color or the soiled state of the spokes 142 of wheel 140.

According to an embodiment, emission cone 260 has a high half cone angle, that is, greater than 10 degrees, more preferably greater than 20 degrees, for example, equal to 27 degrees or to approximately 27 degrees.

Preferably, the source of the pulses of ToF sensor 230 is point-like or substantially point-like at the scale of the dimensions of one-person vehicle 200. More preferably, emission cone 2660 then has a symmetry of revolution around axis 262. The cone angle of emission cone 260 thus is that of the cone of revolution. As a variation, emission cone 260 is not circular, and the cone angle is defined by the maximum angle formed between generatrixes of the cone.

In variants where the pulse source is not point-like, the emission cone 260 such as defined hereabove may diverge from the shape of a cone in its portion closest to the pulse source. The cone angle of emission cone 260 is then defined for the cone portion most distant from the apex.

An advantage of the above-defined high values of the cone angle of emission cone 260 over variants where emission cone 260 has a cone angle value smaller than such high values is to decrease the risk for one of spokes 142 to pass through emission cone 260 without for such a passage to be detected.

According to an embodiment, ToF sensor 230 is contained in, or forms, an integrated circuit package. The term integrated circuit package designates a package, preferably tight, containing one or a plurality of integrated circuits and comprising connection areas and/or pins. The connection areas and/or the pins are electrically coupled to the integrated circuits and are intended to be electrically coupled, preferably welded, to a printed circuit board PCB. As an example, ToF sensor 230 is of the type sold under reference "ST VL53L1X". As an example, the package is sufficiently small to be inscribed within a parallelepiped having side dimensions equal to 5 mm, 3 mm, and 2 mm, for example, respectively equal to 4.5 mm, 2.5 mm, and 1.56 mm.

A ToF sensor 230 contained in an integrated circuit package enables to easily obtain the high values, defined hereabove, of the cone angle of emission cone 260. Further, as compared with a speed measurement device with a magnet and a coil, ToF sensor 230 has the advantage of being compact. In particular, ToF sensor 230 is particularly easy to install. Further, ToF sensor 230 may easily be located in a housing located in the arm 240 of front fork 124. The fact of providing for ToF sensor 230 to be located in such a housing enables to easily protect ToF sensor 230.

Figure 3:
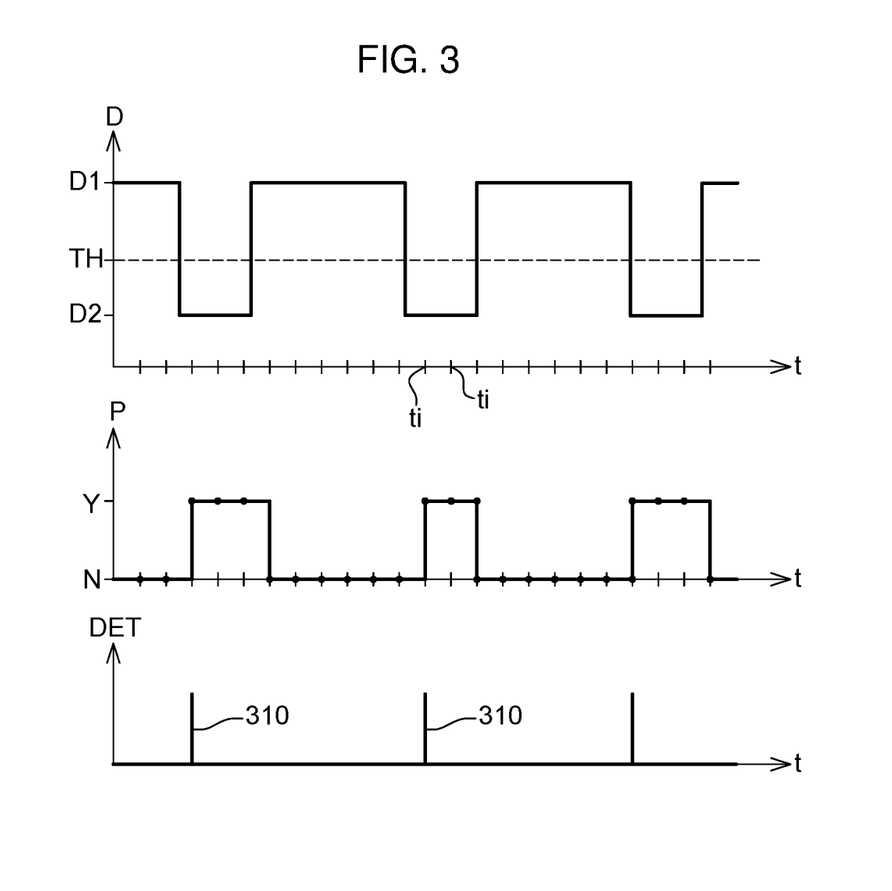
FIG. 3 shows, in simplified timing diagrams, an embodiment of a method of measuring the rotation speed of a wheel of the one-person vehicle of FIG. 2.

FIG. 3 shows, in simplified timing diagrams, an example of implementation of a method of rotation speed measurement by the device 210 described hereabove in relation with FIG. 2. More particularly, it shows, according to time t:
  a distance D between ToF sensor 230 and an element located in front of ToF sensor 230;
  a binary value P representative of the absence (N)/of the presence (Y) of a spoke 142 in front of a ToF sensor 230; and
  times of detection (DET) of the passing of a spoke 142 of wheel 140 in front of ToF sensor 230.

As an example, ToF sensor 230 is configured to deliver, at each pulse of ToF sensor 230, a signal representative:
  when no element is located in front of ToF sensor 230, of the absence of an element in front of ToF sensor 230;
  when a single element is located in front of the sensor, of the distance between ToF sensor 230 and this element; and
  when a plurality of elements are located in front of ToF sensor 230, of the distance between ToF sensor 230 and the closest element located in front of ToF sensor 230.

In the shown example, distance D takes a value D1 when no spoke is located in front of the sensor. Value D1 may correspond to the distance between ToF sensor 230 and arm 245 (FIG. 2). When a spoke 142 passes in front of ToF sensor 230, distance D takes a value D2 smaller than value D1. Spoke 142 then is the closest element located in front of the sensor.

At times ti, preferably regularly repeated, ToF sensor 230 emits the optical pulses and delivers a signal representative of the distance D measured by the sensor. This signal takes measured values representative of values D1 and D2. In variants, for example, when arm 245 (FIG. 2) is not located in emission cone 260, the value representative of value D2 may be replaced with any value representative of the absence of a spoke 142 in front of ToF sensor 230.

Device 210 compares the signal delivered by ToF sensor 230 with a value representative of a distance threshold TH. Device 210 then distinguishes between the presence and the absence of elements located in front of the sensor at a distance shorter than distance TH. In the case of regular pulses, the presence and the absence are thus distinguished at regularly repeated times. As an example, distance threshold TH is in the range from 0.5 cm to 7 cm, for example, equal to approximately 7 cm, preferably in the range from 0.5 cm to 3 cm, for example, equal to approximately 3 cm.

Signal P results from the comparison between the distance measured by time of flight and threshold TH. Signal P takes a level N when an optical pulse occurs in the absence of a spoke 142 in front of ToF sensor 230, and takes a level Y when a spoke 142 is in front of ToF sensor 230 during a pulse of ToF sensor 230. As an example, the level of signal P is stored by device 210 between two successive pulses of ToF sensor 230.

In the shown example, the passing of a spoke 142 in front of ToF sensor 230 is detected (detections 310) at each switching of signal P from level N to level Y. In another example, the passing of spoke 142 is detected at each switching of signal P from level Y to level N. The rotation speed of wheel 140 is calculated from the frequency of detections 310. An embodiment of a calculation of the rotation speed from detections 310 is described hereafter in relation with FIG. 4.

As compared with a speed measurement device with a magnet and a coil, an advantage of time-of-flight measurement device 210 is that the detection of the passing of the spokes is almost insensitive to the value of threshold TH, provided, in the shown example, for threshold TH to be between values D1 and D2. Threshold TH is thus much easier to define than a threshold to detect a passing based on a voltage induced by the passing of a magnet in front of a coil. Device 210 is thus more reliable and easier to adjust.

A specific example of a method of time-of-flight detection of the passing of elements such as the spokes 142 of wheel 140 has been described hereabove in relation with FIG. 3. The embodiments are not limited to this specific example, and may implement any method of time-of-flight detection of the presence and/or of the absence of a given element in front of a ToF sensor.

Figure 4:
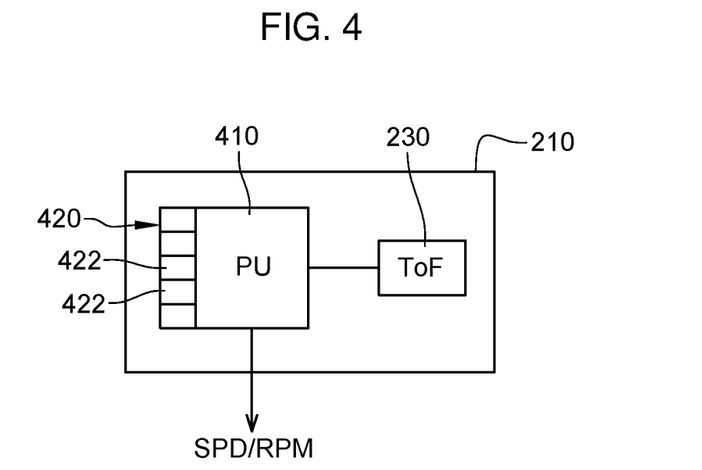
FIG. 4 schematically shows in the form of blocks an embodiment of a device configured to implement the method of FIG. 3.

FIG. 4 schematically shows in the form of blocks an embodiment of the device 210 of the one-person vehicle 200 of FIG. 2.

Device 210 comprises, in addition to the above-described ToF sensor 230, a sequential data processing unit 410 (PU), such as a microprocessor. Processing unit 410 may comprise a memory and/or be coupled or connected to a memory of device 210. The memory comprises a program having its execution by processing unit 410 causing the calculation of a value SPD/RPM representative of the measured rotation speed SPD and/or of the displacement speed of one-person vehicle 200. Preferably, processing unit 410 and ToF sensor 230 are located on a same printed circuit PCB. Processing unit 410 and ToF sensor may also be in a same printed circuit package.

Preferably, device 210 further comprises a stack 420 of first-in-first-out or FIFO type. FIFO stack 420 has locations 422 for example in processing unit 410, in the memory, or in another memory of device 210. This other memory is then preferably located on the same printed circuit as processing unit 410 and ToF sensor 230, for example, in the same package.

FIFO stack 410 comprises a given number N0 of locations. In the shown example, FIFO stack 420 comprises five locations.

In operation, at each detection 310, the duration of the time interval separating this detection 310 from the previous detection 310 is stored in FIFO stack 420. Once FIFO stack 420 is filled, the stack contains, at each detection 310, the durations of the N0 time intervals between the N0+1 successive detections 310 formed by the considered detection 310 and the N0 previous detections 310.

The value SPD/RPM delivered by device 210 then is a value representative of a ratio of the given number N0 to the sum of the N0 durations of time intervals stored in FIFO stack 420.

In a variation, the SPD/RPM value delivered by device 210 is calculated according to a single time interval, that is, based on only two successive detections 310. As compared with this variation, the SPD/RPM value, calculated from a plurality of durations of time intervals, is closer to a value representative of the real rotation speed, in other words, the measurement of the rotation speed and/or of the displacement speed of one-person vehicle 200 is more accurate.

Preferably, the given number N0 is strictly between three and ten times the number of spokes 142 of wheel 140. As compared with variants where the given number is greater than ten, the sensor response time is improved. As compared with variants where the given number is smaller than two, the accuracy of the measurement is improved. The given number N0 thus optimizes the tradeoff between the response time of device 210 and the accuracy of the measured speed of rotation of wheel 140 and/or of displacement of one-person vehicle 200.

The example of device 210 described hereabove in relation with FIG. 4 is not limiting. Thus, in other examples, device 210 delivers, instead of value SPD/RPM, a signal conveying information of detection of the passing of the spokes in front of the sensor, for example, in the form of a pulse at each detection 310. The signal may be delivered to a device such as unit 226 (FIG. 2). Preferably, unit 226 implements the calculation of the speed of rotation of wheel 140 and/or of displacement of one-person vehicle 200 in a way similar to that described hereabove in relation with FIG. 4.

The calculation of the value SPD/RPM representative of the measured rotation speed, described hereabove in relation with FIG. 4, is not limiting either. Thus, the embodiments are compatible with any method of calculation of the speed of rotation of wheel 140 and/or of displacement of one-person vehicle 200, based on detections 310. Preferably, the calculation is performed from a plurality of durations of time intervals. As an example, the calculation may be of any type of sliding average between rotation speed values calculated during said time intervals.

According to an advantage of the ToF measurement frequency, such as mentioned hereabove, the frequency of the ToF measurements is sufficiently fast for each passing to be detected. In variations, the frequency of the ToF measurements is smaller than a limit short of which some of the passages are not detected. However, as compared with such variations, the above-mentioned sufficiently fast frequencies enable to simplify the calculation of the rotation speed.

The embodiments and their variants are not limited to the examples described hereabove in relation with FIGS. 2 to 4.

Thus, in the above-described embodiments, the ToF sensor is rigidly secured to an arm of a fork. However, to measure the rotation speed of a wheel, the sensor may be attached to any arm comprising a bearing or a rotation shaft of the wheel. The term arm means any element comprising a portion extending radially from the axis of the wheel, so that the spokes pass in front of the sensor. More generally, the ToF sensor may be located on any fixed element of a one-person vehicle enabling the spokes to pass in front of the sensor.

In the above-described embodiments, device 210 detects the passing of a plurality of spokes 142 of wheel 140. In other embodiments, the wheel comprises a target attached to one or a plurality of spokes of the wheel or a plurality of targets attached to spokes of the wheel. The passing of the target(s) through a position located in front of a ToF sensor is detected. The ToF sensor is then positioned so that the target(s) pass in the emission cone of the ToF sensor during the rotation of the wheel. In still other embodiments, the wheel comprises no spokes, for example, the wheel is solid, and the wheel then comprises one or a plurality of targets.

In the above-described embodiments, ToF sensor 230 is rigidly secured to a fixed element and oriented towards a position having one or a plurality of elements of wheel 140 passing therethrough. In other embodiments, the rotation speed is measured by using a ToF sensor rigidly secured to the wheel and positioned to be oriented, at each passing of the wheel through a given position, towards an element fixed with respect to the given position. Thus, in a variant of the example of FIG. 2, ToF sensor 230 is attached to one of the spokes 142 of wheel 140, and the fixed element is a portion of arm 240. The fixed element may also be a target rigidly secured to arm 240. According to an advantage, the number of passages is thus decreased at each revolution, which enables to increase the measureable rotation speed for a same given measurement frequency ToF, and/or to decrease the ToF measurement frequency for a same maximum measureable rotation speed.

The embodiments are described hereabove in the example where one-person vehicle 200 is a scooter. However, the embodiments are also applicable to any one-person vehicle, in particular as defined hereabove in relation with FIG. 1. This, a scooter, an electric scooter, a bicycle, a tricycle, an electric bicycle, a gyrowheel, or a gyropod, comprising a device for measuring the speed of rotation of a wheel and/or of displacement of the one-person vehicle, the speed measurement comprising time-of-flight detections of the passing of one or a plurality of elements of the wheel, such as spokes or targets, through a given position. A wheel comprising one or a plurality of targets is preferred in the case of an absence of spokes (solid wheel) or of relatively thin spokes, such as those of a bicycle, and the absence of a target is preferred in the case of relatively thick spokes.

Further, the above-described method of measuring the rotation speed of a wheel, comprising time-of-flight detections of the passing of one or a plurality of elements of the wheel through a given position, may be applied to other vehicles than one-person vehicles. More generally, the wheel of the above-described embodiments may be replaced with most objects capable of rotating. The ToF sensor may then be rigidly secured to a fixed element and oriented towards a position having one or a plurality of elements of this object passing therethrough, when the object is rotating. The ToF sensor may also be rigidly secured to this object and positioned to be oriented towards a fixed element at each passing of the object through a given position.

In particular, the rotating object may be a wheel of a sports training device, such as an exercise bike. The device is then preferably equipped with a display or is coupled, by a wired or wireless connection, to a display. In operation, the display provides a user of the device with an indication in the form of speed, representative of a physical effort made by the user.

Figure 5:
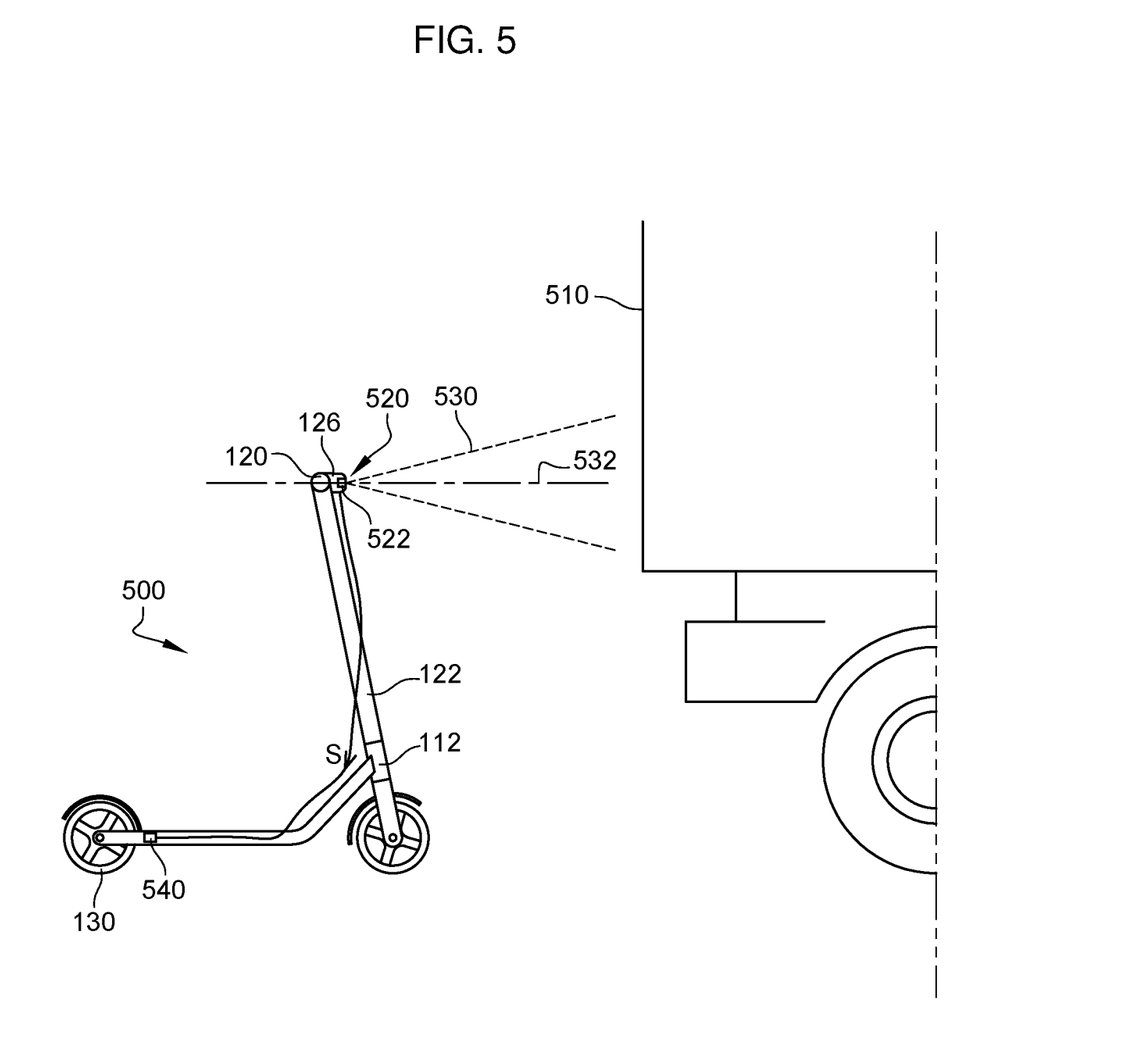
FIG. 5 schematically shows an obstacle and an embodiment of a one-person vehicle, according to the second aspect.

Second Aspect:

FIG. 5 schematically shows an embodiment of a one-person vehicle 500 according to the second aspect and an obstacle 510, for example, a truck.

Obstacle 510 may be any element or object, such as another vehicle, or any living being, for example, animal or human, capable of colliding with one-person vehicle 500 and/or its user, and to cause an accident.

In the shown example, one-person vehicle 500 comprises elements identical or similar to those of the scooter 100 of FIG. 1. These elements are not described in detail again. Only the differences between one-person vehicle 500 and scooter 100 are here highlighted.

One-person vehicle 500 comprises a device 520 of protection against collisions, or anticollision device 520. Preferably, anticollision device 520 is located at the front of one-person vehicle 500. In the shown example, anticollision device 520 is attached to handlebar 120 or to display 126. Anticollision device 520 may also, in other examples, be attached to rod 122.

Anticollision device 520 comprises a ToF sensor 522, such as defined hereabove in relation with FIG. 2, that is, a device configured to deliver, by time-of-flight measurement of optical pulses, information concerning the presence of an object external to the ToF sensor and/or information representative of a distance between the ToF sensor and the external object.

Preferably, the optical pulses of ToF sensor 522 have wavelengths all, or substantially all, located in near infrared, that is, wavelengths in the range from 700 nm to 1,500 nm, preferably in the range from 940 nm to 1,500 nm, more preferably equal to 940 nm or to approximately 940 nm.

Preferably, the ToF measurements performed by ToF sensor 522 are regularly repeated, and each ToF measurement may correspond to a plurality of pulses. The frequency of the ToF measurements is then preferably in the range from 1 Hz to 100 Hz, for example, equal to 30 Hz or to approximately 30 Hz. The frequency of the ToF measurements may also be greater than 100 Hz, although, as a comparison, the selection of a measurement frequency ToF smaller than 100 Hz enables to improve the accuracy of the measurement.

In operation, the optical pulses of ToF sensor 522 are typically emitted in an emission cone 530 having an axis 532. More particularly, emission cone 530 is delimited by a boundaries defined, in each plane orthogonal to axis 532, by the points where the intensity of the pulses is equal to a given percentage of a maximum intensity of the pulses per surface area unit of the plane, in the absence of an obstacle located on the path of the pulses. The given percentage is preferably smaller than or equal to 10%, for example, equal to 5%.

ToF sensor 522 is preferably oriented towards the front of one-person vehicle 500, that is, axis 532 is substantially, to within 30 degrees, preferably to within 15 degrees, parallel to the displacement direction, or longitudinal direction, of one-person vehicle 500. When one or a plurality of obstacles are located on the way of one-person vehicle 500, the obstacle(s) are then located in front of ToF sensor 522, that is, in emission cone 530. Thus, the ToF sensor detects the presence of the obstacle(s) 510 located on the way of one-person vehicle 500. ToF sensor 522 delivers information representative of the distance between the sensor and the obstacle if the obstacle is alone in front of the sensor, or between the sensor and the obstacle closest to the sensor if there is a plurality of obstacles in front of the sensor.

In operation, when an obstacle is located in emission cone 530, anticollision device 520 determines, based on the information delivered by ToF sensor 522, a measured value of the relative speed between one-person vehicle 500 and the obstacle. An example of calculation of the measured speed is described hereafter in relation with FIG. 7. Anticollision device 520 takes, according to the measured relative speed value, a counter-measure intended to avoid a collision.

Preferably, when the measured value of the relative speed between one-person vehicle 500 and obstacle 510 is greater than a threshold, anticollision device 520 delivers a signal S for braking one-person vehicle 500. For this purpose, more preferably, one-person vehicle 500 is an electric vehicle provided with a braking device 540, for example, a device for braking the rear wheel 130 of one-person vehicle 500. Braking device 540 receives signal S and stops or slows down one-person vehicle 500. The braking enables to avoid colliding with the obstacle.

In variants, anticollision device 520 analyzes the variation of the relative speed, and acts on the speed of the one-person vehicle to avoid a collision, for example, to decrease the relative speed. As compared with such variants, the fact of triggering a braking when the relative speed exceeds a threshold is much simpler to implement.

Preferably, the speed threshold is smaller than or equal to 20 km/h, more preferably in the range from 8 km/h to 15 km/h. The speed thresholds are particularly capable of protecting one-person vehicles against collisions.

An advantage of anticollision device is that it allows an earlier braking than if, in the absence of this device, the user should himself trigger the braking. A delay linked to the user's reaction time is avoided.

It could have been devised to trigger a braking when an obstacle is detected and the vehicle displacement speed is greater than a threshold. As a comparison with such a triggering according to the displacement speed of one-person vehicle 500 (absolute speed), the triggering according to the relative speed between one-person vehicle 500 and obstacle 510 enables the user of one-person vehicle 500 to follow obstacle 510 when the latter displaces at a speed substantially equal to the displacement speed of one-person vehicle 500, without for the braking to be triggered.

Preferably, the method is only implemented for one or a plurality of obstacle(s) at least located at distances, shorter than a first threshold, from the source of the optical pulses of ToF sensor 522. For this purpose, for example, anticollision device 520 determines the measured speed for these obstacles only, and more preferably, only these obstacles are detected by ToF sensor 522. Preferably, the first threshold is smaller than 4 meters or than approximately 4 meters. It is thus avoided to cause a braking for an obstacle that the user of one-person vehicle 500 has time to avoid or intends to avoid.

Preferably, the method of protection against collisions is implemented for any single obstacle, at least partly located at any position in emission cone 530 and at any distance, shorter than a second threshold, from the source of the optical pulses of ToF sensor 522. When a plurality of obstacles is at least partly present in emission cone 530 at distances from the pulse source shorter than the second threshold, the protection method is implemented for the closest obstacle. The second threshold is shorter than the first threshold. Preferably, the second threshold is greater than 2 meters or than approximately 2 meters.

Preferably, emission cone 530 has a high half cone angle, that is, greater than 10 degrees, more preferably greater than 20 degrees, for example, equal to 27 degrees or to approximately 27 degrees. The half cone angle of emission cone 530 is defined similarly to the cone angle of emission cone 260 (FIG. 2) defined in relation with FIG. 2. Preferably, the pulse source of ToF sensor 522 is point-like or substantially point-like at the scale of the dimensions of one-person vehicle 500 and/or emission cone 530 has a symmetry of revolution around axis 532.

As compared with variants where the half cone angle of emission cone 530 does not have the above-defined high values, the high values of the half cone angle enable to avoid risks of collision with obstacles more remote from axis 532. In particular, this enables to avoid risks of collision with a mobile obstacle displacing transversely to the longitudinal direction of the displacement of one-person vehicle 500. An example of such an obstacle is a pedestrian crossing the trajectory of one-person vehicle 500.

According to an embodiment, ToF sensor 522 is contained in, or forms, an integrated circuit package. As an example, ToF sensor 522 is of the type sold under reference ST VL53L1X. As an example, the package is sufficiently small to be inscribed within a parallelepiped having side dimensions equal to 5 mm, 3 mm, and 2 mm, for example, equal to respectively 4.5 mm, 2.5 mm, and 1.56 mm.

Such a ToF sensor included in an integrated circuit package enables to easily obtain the high values, defined hereabove, of the cone angle of emission cone 530, and enables to easily obtain the first and second above-defined distance thresholds. Further, advantageously, a ToF sensor included in an integrated circuit package is particularly light and easy to implement in a one-person vehicle.

Figure 6:
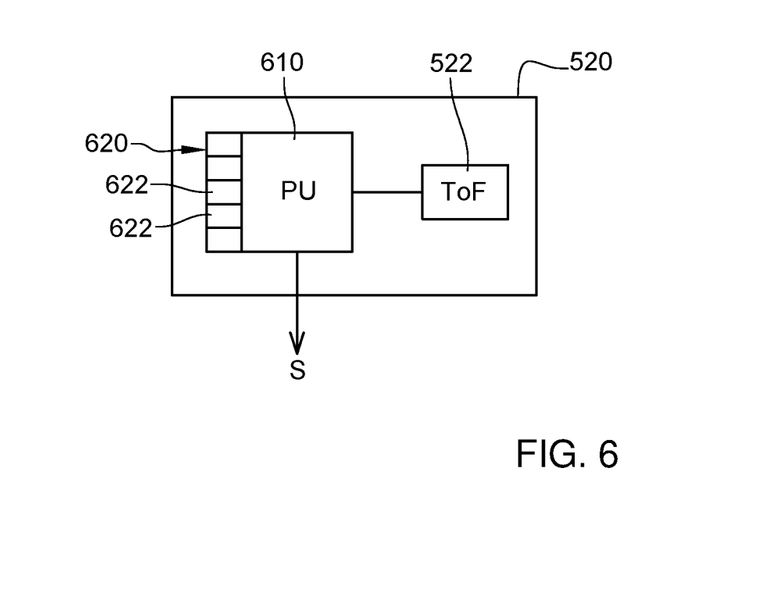
FIG. 6 schematically shows in the form of blocks an embodiment of an anticollision device of the one-person vehicle of FIG. 5.

FIG. 6 schematically shows in the form of blocks an embodiment of the anticollision device 520 of the one-person vehicle 500 of FIG. 5.

Anticollision device 520 comprises, in addition to the above-described ToF sensor 522, a sequential data processing unit 610 (PU), such as a microprocessor. Processing unit 610 may comprise a memory and/or be coupled, or connected, to a memory of anticollision device 520. The memory comprises a program having its execution by processing unit 610 causing the emission of braking signal S according to the relative speed between one-person vehicle 500 and an obstacle. Preferably, processing unit 610 and ToF sensor 522 are located on a same printed circuit PCB. Processing unit 610 and ToF sensor 522 may also be in a same printed circuit package.

Preferably, anticollision device 520 further comprises a stack 620 of first-in-first-out or FIFO type. FIFO stack 620 has locations 622 for example in processing unit 610, in the memory, or in another memory of anticollision device 520. This other memory is then preferably located on the same printed circuit as processing unit 610 and ToF sensor 522, for example, in the same package.

FIFO stack 620 comprises a given number N0 of locations. In the shown example, FIFO stack 620 comprises five locations.

In operation, for each pulse of ToF sensor 522, a value of the distance measured by ToF sensor 522 between ToF sensor 522 and the obstacle is stored in FIFO stack 620. When FIFO stack 620 is full, it contains the distance values measured at several times.

Figure 7:
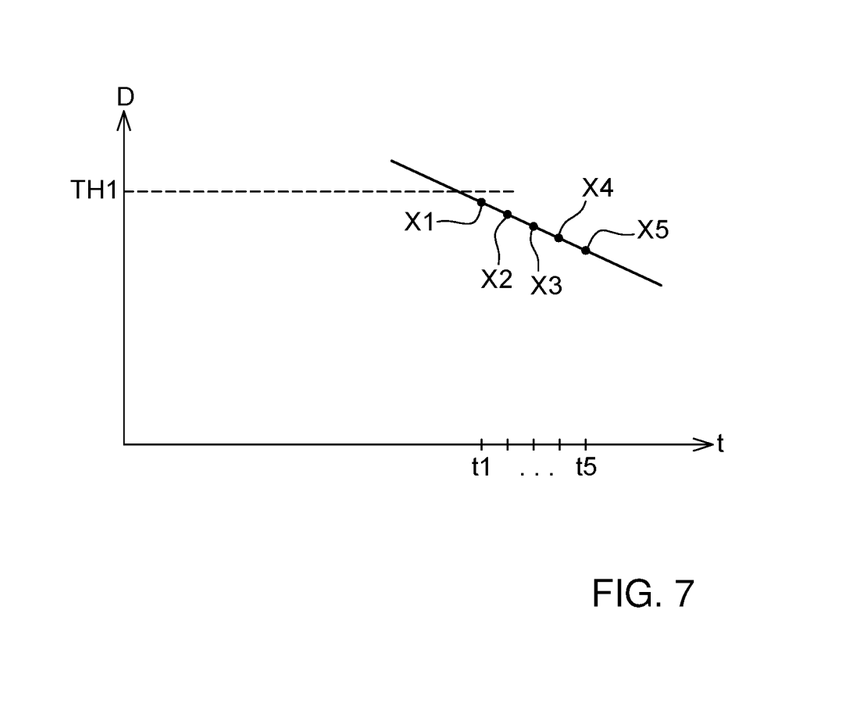
FIG. 7 shows a curve, according to time, of a distance between the one-person vehicle of FIG. 5 and an obstacle.

FIG. 7 shows a curve of the distance according to time between one-person vehicle 500 and an obstacle, in an example of calculation of the relative speed measured between one-person vehicle 500 and an obstacle. Preferably, the calculation is implemented by processing unit 610 of the example of anticollision device 520 of FIG. 6.

In this example of calculation, the measured values (X1, X2, X3, X4, X5) of the distance between one-person vehicle 500 and the obstacle at several times ti (t1, t5) are stored, for example, in FIFO stack 620. Preferably, times ti correspond to successive pulses of ToF sensor 522. Preferably, the storage is performed only when the distance between one-person vehicle 500 and the obstacle is smaller than first distance threshold TH1. The measured relative speed value is obtained by linear regression of the measured values according to time.

An advantage of a calculation by linear regression is that it is particularly simple to implement. However, the described embodiments are not limited to this example, and any calculation enabling to determine the relative speed between a vehicle and an object may be implemented based on measured values of the distance between the vehicle and the object at several times.

The embodiments of the second aspect are described hereabove in the example where the one-person vehicle is a scooter. However, the embodiments of the second aspect are also applicable to any one-person vehicle, in particular such as defined hereabove in relation with FIG. 1. Thus, any one-person vehicle, such as a scooter, an electric scooter, a bicycle, a tricycle, an electric bicycle, a gyrowheel or, for example, a gyropod, comprising an anticollision device measuring by time of flight a relative speed between the one-person vehicle and an obstacle, may be provided.

Various embodiments and variants have been described. Those skilled in the art will understand that certain features of these various embodiments and variants may be combined, and other variants will occur to those skilled in the art. In particular, one-person vehicles comprising a device according to the first aspect, that is, configured to measure by time of flight a rotation speed of a wheel of the vehicle and/or a speed of the vehicle, may further comprise an anticollision device according to the second aspect, that is, measuring by time of flight a relative speed between the one-person vehicle and an obstacle.

Finally, the practical implementation of the described embodiments and variants is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method of measuring the rotation speed of a rotating object, comprising:
    emitting a plurality of optical pulses toward the rotating object;
    reflecting certain ones of the optical pulses from one or more of a plurality of elements of said rotating object;
    detecting a time-of-flight of the reflected optical pulses; and
    deriving the rotational speed from the detected time-of flight.

2. The method according to claim 1, wherein said rotating object is a wheel, and said plurality of elements comprise spokes of the wheel.

3. The method according to claim 1, further comprising delivering a linear speed of the object based on the derived rotational speed.

4. The method according to claim 1, wherein said rotating object is a wheel of a one-person vehicle or of a sports training device, and further comprising delivering a speed of the one-person vehicle or of the sports training device based on the derived rotational speed.

5. The method according to claim 1, further comprising calculating a value representative of the derived rotational speed by using a given number of time intervals between time-of-flight detections the reflected optical pulses, wherein said given number is greater than or equal to two.

6. The method according to claim 5, wherein the given number is between three and ten times a number of said one or more of the plurality of elements of said rotating object.

7. The method according to claim 1, wherein said plurality of optical pulses are infrared pulses.

8. The method according to claim 1, wherein detecting the time-of-flight of the reflected optical pulses comprises:
    generating a distance value representative of a distance from an emitter of said plurality of optical pulses to said one or more of the plurality of elements of said rotating object; and
    comparing the distance value to a distance threshold in order to detect a passing of said one or more of the plurality of elements of said rotating object; and
    wherein deriving the rotational speed comprises determining the rotational speed as a function of the detected passings.

9. A device for measuring the rotation speed of a rotating object, comprising:
    an emitter configured to emit a plurality of optical pulses toward the rotating object;
    wherein certain ones of the optical pulses are reflected from one or more of a plurality of elements of said rotating object;
    a circuit configured to detect a time-of-flight of the reflected optical pulses and derive the rotational speed from the detected time-of flight detections.

10. The device according to claim 9, wherein said rotating object is a wheel, and said plurality of elements comprise spokes of the wheel.

11. The device according to claim 9, wherein said circuit is further configured to deliver a linear speed of the object based on the derived rotational speed.

12. The device according to claim 9, wherein said rotating object is a wheel of a one-person vehicle or of a sports training device, and wherein said circuit is further configured to deliver a speed of the one-person vehicle or of the device based on the derived rotational speed.

13. The device according to claim 9, wherein a value representative of the derived rotation speed is calculated by using a given number of time intervals between time-of-flight detections, wherein said given number is greater than or equal to two.

14. The device according to claim 13, wherein the given number is between three and ten times a number of said one or more of the plurality of elements of said rotating object.

15. The device according to claim 9, wherein said emitter and circuit form a time-of-flight sensor that is rigidly secured to an element which is fixed with respect to said rotating object.

16. The device according to claim 15, wherein the time-of-flight sensor is contained in an integrated circuit package.

17. The device according to claim 9, wherein said emitter and circuit form a time-of-flight sensor configured to distinguish, at regularly repeated times, between presence and absence of one or more of the plurality of elements of said rotating object in front of the time-of flight sensor and at a distance from the time-of-flight sensor that is shorter than a threshold.

18. The device according to claim 17, wherein said detections comprises detections of the switching from absence to presence and from presence to absence.

19. The device according to claim 9:
    wherein said circuit detects the time-of-flight of the reflected optical pulses by:
        generating a distance value representative of a distance from the emitter of said plurality of optical pulses to said one or more of the plurality of elements of said rotating object; and
        comparing the distance value to a distance threshold in order to detect a passing of said one or more of the plurality of elements of said rotating object; and
    wherein said circuit derives the rotational speed by determining the rotational speed as a function of the detected passings.

20. A one-person vehicle or a sports training device comprising the device according to claim 9.

21. The one-person vehicle or the sports training device according to claim 20, wherein said emitter and circuit form a time-of-flight sensor rigidly secured to an element of the one-person vehicle or the sports training device.

22. The one-person vehicle or the sports training device according to claim 21, further comprising an arm including a bearing or a rotation shaft of said rotating object, and wherein said element is a portion of the arm or is attached to a portion of the arm.

23. A method for measuring the rotational speed of an object, comprising:
   making time of flight detections, using a time of flight sensor, of a passing of one or more elements of said object through a given position;
   wherein time of flight detection comprises:
      emitting optical pulses by the time of flight sensor;
      generating, by the time of flight sensor, a distance value representative of a distance measured by the time of flight sensor; and
      comparing the distance value with a distance threshold in order to detect the passing of said one or more elements.

24. The method according to claim 23, wherein said object is a wheel, and said one or more elements comprises, or is attached to, one or more spokes of the wheel.

25. The method according to claim 24, further comprising determining a speed of a device to which said wheel is a component, said speed being dependent on the measured rotational speed.

26. The method according to claim 23, further comprising determining a representative value of the measured rotational speed based on a calculation which uses a given number of time intervals between detections, said given number being greater than or equal to two.

27. A device for measuring the rotation speed of a rotating object, comprising:
   a time of flight sensor configured to make time of flight detections of a passing of one or more elements of said object through a given position;
   wherein said time of flight sensor includes:
      an emitter configured to emit a plurality of optical pulses toward the rotating object; and
      a processing circuit configured to generate a distance value representative of a distance measured by the time of flight sensor; and
   a comparing circuit configured to compare the distance value with a distance threshold in order to detect the passing of said one or more elements.

28. The device according to claim 27, wherein said object is a wheel, and said one or more elements comprises, or is attached to, one or more spokes of the wheel.

29. The device according to claim 28, further comprising a circuit configured to determine a speed of a device to which said wheel is a component, said speed being dependent on the measured rotational speed.

30. The device according to claim 27, further comprising a circuit configured to determine a representative value of the measured rotational speed based on a calculation which uses a given number of time intervals between detections, said given number being greater than or equal to two.

31. The device according to claim 27, wherein the distance measured by the time of flight sensor is a distance between the emitter of said optical pulses and said one or more elements of said object.

32. The method according to claim 23, wherein the distance measured by the time of flight sensor is a distance between an emitter of said optical pulses and said one or more elements of said object.

* * * * *